United States Patent [19]

Kumar et al.

[11] Patent Number: 5,632,684

[45] Date of Patent: May 27, 1997

[54] STEPPED SHAFT ASSEMBLY

[75] Inventors: Ajay Kumar, Webster; Porfirio J. Perez, Walworth; Dhirendra C. Damji, Webster; Douglas W. Shaffer, Pittsford, all of N.Y.

[73] Assignee: Xerox Corporation, Stamford, Conn.

[21] Appl. No.: 547,172

[22] Filed: Oct. 24, 1995

[51] Int. Cl.$^6$ .................................................. F16C 3/00
[52] U.S. Cl. ........................... 464/179; 74/DIG. 10; 464/181
[58] Field of Search .................... 464/181, 179, 464/183, 182; 74/DIG. 10; 403/361, 360, 368, 282

[56] References Cited

U.S. PATENT DOCUMENTS

| | | | |
|---|---|---|---|
| 1,345,735 | 7/1920 | Bailey | 464/182 X |
| 3,698,749 | 10/1972 | Yonkers | 403/368 X |
| 4,188,800 | 2/1980 | Fujita et al. | 464/179 |
| 4,704,918 | 11/1987 | Orkin et al. | 464/181 X |
| 5,064,225 | 11/1991 | Williams et al. | 464/368 X |
| 5,322,580 | 6/1994 | McIntire et al. | 464/181 X |
| 5,439,416 | 8/1995 | Jaskowiak | 464/181 |

FOREIGN PATENT DOCUMENTS

| | | | |
|---|---|---|---|
| 2212774 | 10/1972 | Germany | 464/179 |
| 840607 | 12/1985 | Germany | 464/182 |
| 3822637 | 1/1990 | Germany | 464/181 |

*Primary Examiner*—Daniel P. Stodola
*Assistant Examiner*—Eileen A. Dunn

[57] ABSTRACT

A shaft assembly and method of forming a shaft assembly having an elongated hollow shaft with a stepped portion on the surface of the shaft. The stepped portion of the shaft surface is formed of two straight edge sections joined by an inclined section. A gear having a corresponding straight/inclined edge configuration engages the shaft and contacts the shaft only on the corresponding straight edge portions. Both the shaft and gear are made of plastic.

19 Claims, 3 Drawing Sheets

STEPPED SHAFT ASSEMBLY

BACKGROUND

This invention relates generally to an elongated shaft, and more particularly concerns forming an elongated plastic shaft with a stepped functional surface. Also described is a gear with a stepped hub that runs on the stepped functional surface of the shaft.

Currently, when molding long plastic shafts a 2–5 degree draft along the length of the shaft is necessary in order for the shaft to be successfully removed from the mold. This means that any gear to be used on the shaft must have its hub formed to allow for the degree of draft of the shaft. Even with the gear designed for the draft of the shaft, there is a sloppy fit between the shaft and gear which results in rattling noise and uneven wear.

FIG. 1 shows an elongated shaft 10 with a base 12, and first section 14 which has a second section 16 connected thereto. The shaft shown is hollow as indicated by bore 18 and formed by an injection molding or extrusion process, however, the shaft may also be solid. Typical plastic materials include thermoplastic and thermosetting resins. Typical thermoplastic resins include polyethylene, polystyrene, polypropylene, polyurethane, polyvinylchloride, nylons, polycarbonate ABS, as well as fluorcarbons. Typical thermosetting resins include acrylics, phenolics and polyesters. In conventional molding processes in order for the molded shaft to be separated from the mold section 14 must have a draft of 2–5 degrees as shown. Gear 20 runs on first section 14 and the gear's hub 22 is designed with a draft corresponding to the draft of the shaft. These angled surfaces of the shaft and the gear do not allow for a tight fit since precise forming of angled surfaces is difficult. The angled gear and shaft configuration has axial forces acting the surfaces where the gear hub and shaft surface come into contact.

A patent teaching a molded shaft with different molded feature is U.S. Pat. No. 5,439,416. The shaft assembly is comprised of an elongated member having a hollow, tubular shell with a hardened moldable material filling the shell and a functional feature molded on the outer surface of the shaft. A gear may be the functional feature integrally molded with the shaft. The teachings of this patent are hereby incorporated by reference.

SUMMARY

In accordance with the present invention plastic shaft is divided into stepped section having of a straight edge region followed by an inclined region which connects another straight edge region.

In accordance with another aspect of the invention, a stepped gear hub is designed to fit on the shaft which runs only on the straight edge regions of the shaft, not on the inclined region. Contact only on the flat surfaces of the shaft and gear leads to a much better fit and improved operating conditions of the shaft assembly, resulting in no rattling noise and increased life of the components. The stepped configuration also aids in assembling the gear onto the shaft in that the positive step prevents backward assembly of the gear onto the shaft.

In accordance with one aspect of the present invention, there is provided a shaft assembly with an elongated shaft having a stepped section with a first straight edge shaft region and a second straight edge shaft region joined by an inclined shaft region; and a gear with a stepped hub having a first straight edge hub region and a second straight edge hub region joined by an inclined hub region.

Pursuant to another aspect of the present invention, there is provided an elongated shaft having a stepped section with a first straight edge shaft region and a second straight edge shaft region joined by an inclined shaft region and adapted to have a gear with a complementary surface fitted therefor.

Yet another aspect of the invention is drawn to a gear with a hub having a stepped region with a first straight edge hub region and a second straight edge hub region joined by an inclined hub region adapted to fit on a complementary elongated shaft with a shaft functional surface fitted therefor.

Other features of the present invention will become apparent as the following description proceeds and upon reference to the drawings, in which.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION

Figure 1:
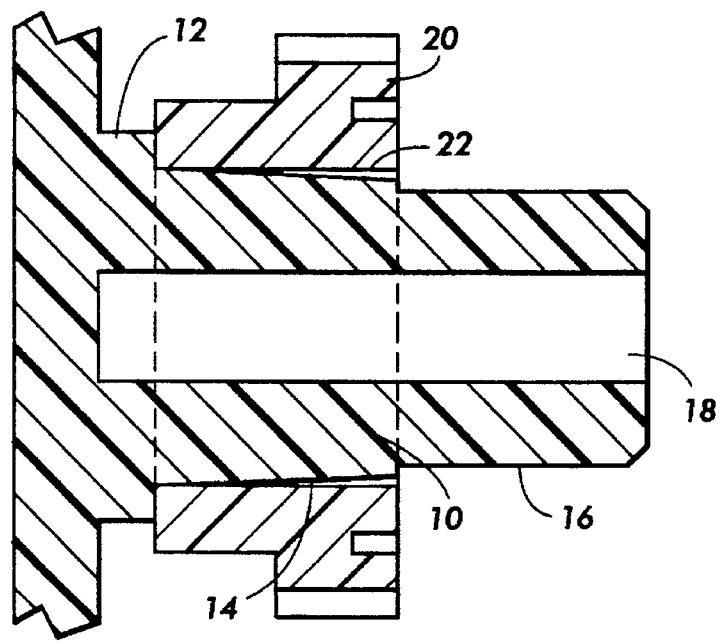
FIG. 1 is a a cross-sectional view of a prior art shaft formed with a draft and a corresponding gear.
Figure 2:
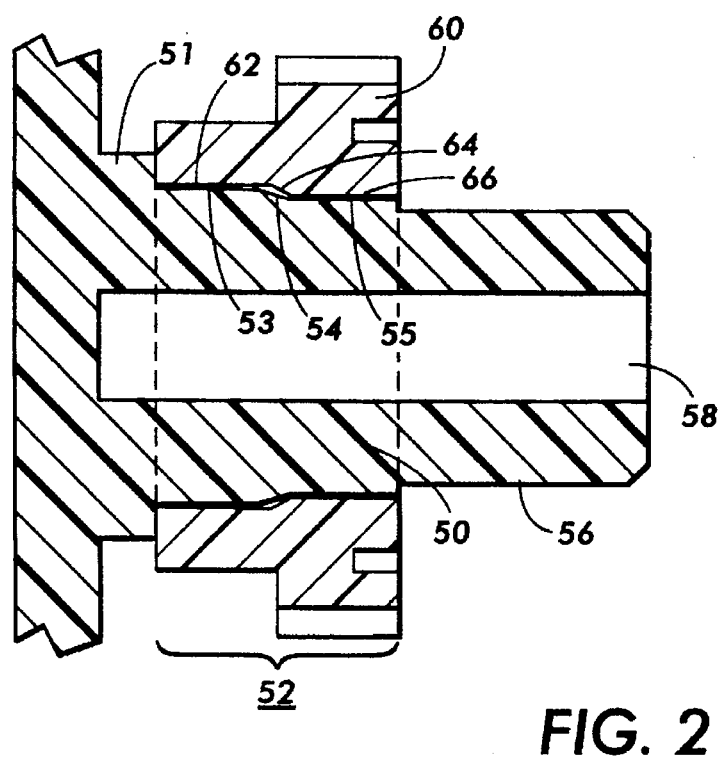
FIG. 2 is a is a cross-sectional view of a shaft formed with steps and a corresponding gear.

FIG. 2 depicts a stepped shaft 50 of the present invention with a base 51, and first section 52 which has a second section 56 attached to it. Section 52 is comprised of two straight edge regions, first straight edge region 53 and second straight edge region 55 with an inclined region 54 connecting the two straight edge regions. This stepped section 52 can be referred to as the shaft functional surface since this is the surface on which a gear may be fitted. A gear 60 has corresponding straight edge regions 62 and 66 with an inclined region 64 connecting the two straight edge regions. The inner diameter of the gear hub 62 and 66 runs on the outer surface of the shaft 53 and 55. As shown, the gear and shaft contact each other only on the straight regions, which leads to a much better fit of the gear onto the shaft and results in more uniform loading along the contact surfaces. The new design of the stepped regions results in an optimal design because there is more material in the fixed end of the shaft, where there is more stress.

The shaft shown is hollow as indicated by bore 58, however the shaft could also be solid. The gear can be attached to the shaft in a number of different ways. For example, the gear may be attached to the stepped shaft functional surface by a snap fit, held with an e-clip, or held in place by external gearing.

Figure 3:
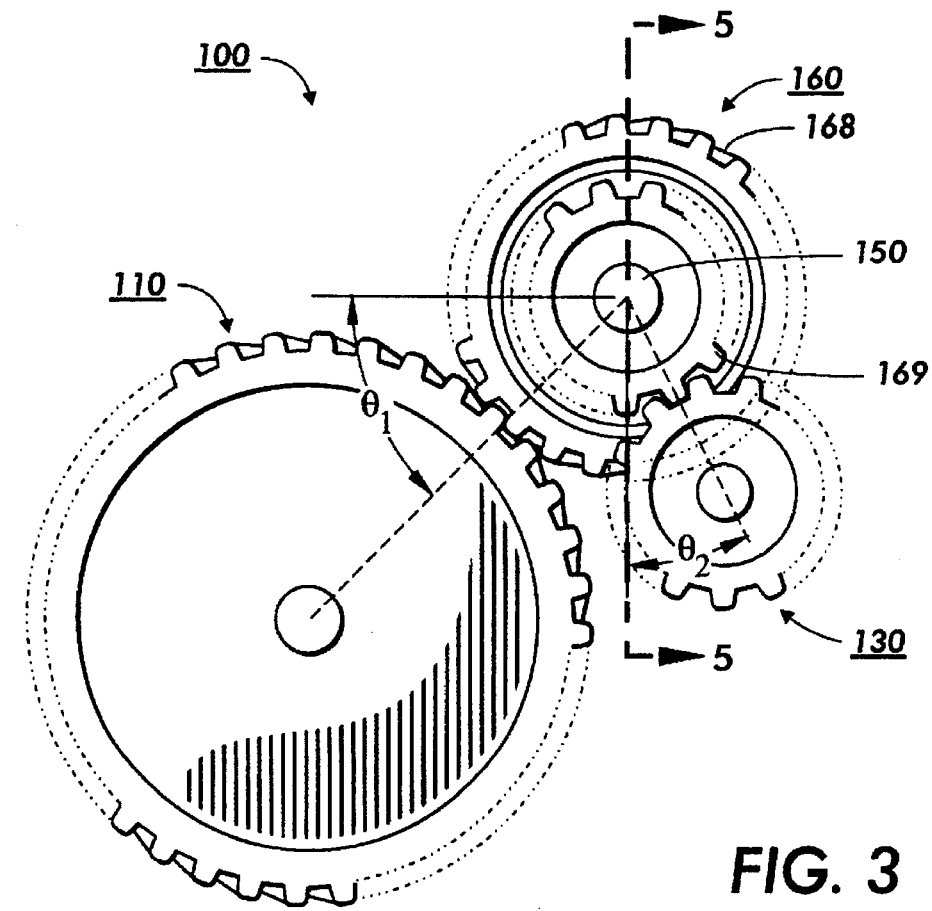
FIG. 3 is a side view view of a gear train.

FIG. 3 is an example of use of the stepped shaft and gear in a Customer Replaceable Unit gear train 100 in a printing machine environment. The three gears shown include a helical photoreceptor gear 110, an idler gear 160 and a spur gear 130. The idler gear is formed of a helical gear section 168 and a spur gear section 169 which runs on shaft 150. The contact angles between the photoreceptor and idler gears and the idler and spur gears are $\Theta_1$ and $\Theta_2$, respectively. In the example shown $\Theta_1$ is 35 degrees and $\Theta_2$ is 16 degrees.

Figure 4:
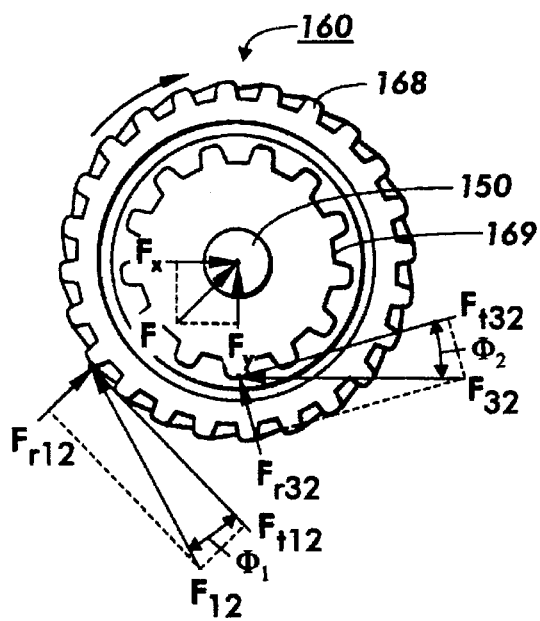
FIG. 4 is a force diagram of an idler gear in the gear train shown in FIG. 3.

FIG. 4 is a force diagram of the forces exerted on the shaft 150 by gears 110 and 130. The first force to be analyzed will be the tangential force on the helical idler gear 168. With the photoreceptor gear pitch diameter drum 30 mm, the normal blade deflection force is 6.5N, the blade angle (A) is 22π/180, and the coefficient of friction M is 1.5 the gear being formed of Acetal plastic, the torque on the photoreceptor gear can be calculated using the following equation:

$$T = M(N\text{blade}/\cos A)(\text{diameter drum}/2)$$

with the values above used T=157.736 Nmm.

The tangential force ($F_t$) on the helical idler gear 168 can now be calculated with the following formula:

$$F_{t2} = 2T/d_1$$

where $d_1$ is the diameter of the idler helical gear, in this example $d_1$ is 20.45 mm and thus $F_{t2}$=15.426N.

Since gear 160 is an idler gear, it transmits no power or torque to its shaft, and so the tangential reaction of gear 130 on gear 160 is the same as $F_{t2}$, i.e. $F_{t32}$=15.426N.

The pressure angles gear 110 and gear 130 have with respect to gear 160 are shown as $\phi_1$ and $\phi_2$. In the example shown $\phi_1$ and $\phi_2$ are both 20 degrees. The radial component of reaction from photoreceptor gear 110 to helical idler gear 168 is given by the following formula:

$$F_{r12} = F_{t12} \tan \phi_1$$

$F_{r12}$=5.615N. The radial component reaction force ($F_r$) from gear 130 to idler spur gear 169 is 5.615N using $F_{r32}=F_{t32}\tan\phi_2$.

The reaction components on shaft 150 can be calculated using the equations below:

$$F_x = F_{t12} \cos \Theta_1 - F_{r12} \sin \Theta_1 - F_{r32} \sin \Theta_2 = F_{t32} \cos \Theta_2$$

$$F_y = F_{t12} \sin \Theta_1 + F_{r12} \cos \Theta_1 + F_{r32} \cos \Theta_2 = F_{t32} \sin \Theta_2$$

Using the above values, $F_x$=−20.625N and $F_y$=−17.002N.

The resultant shaft force can be calculated as follows:

$$F = \sqrt{F_x^2 + F_y^2}$$

and in this case, F=26.73N.

Figure 5:
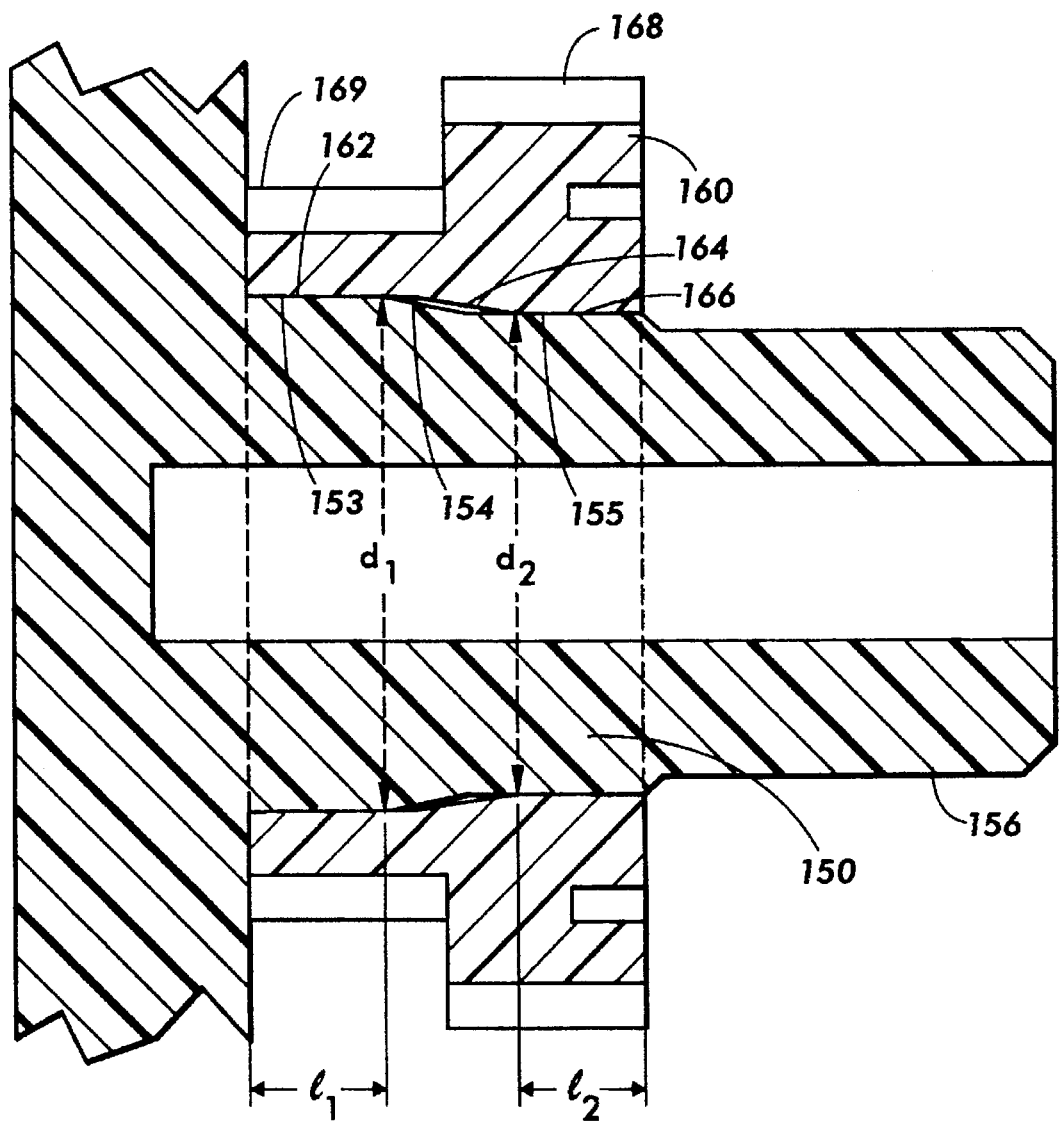
FIG. 5 is a cross-sectional view of the shaft and gear taken along 5/5.

FIG. 5 shows the contact areas of the gear 160 and shaft 150. The contact area between the shaft and the gear plays a key role in the distribution of stress on the shaft. The contact surfaces are located on the straight edge regions of the gear and shaft with the first straight edge region 153 of the shaft contacting the first straight edge region 162 of the gear having an outer diameter $d_1$ and length $l_1$, and the second straight edge region 155 of the shaft contacting the second straight edge region of the gear 166 having an outer diameter $d_2$ and length $l_2$. The angled sections connecting the straight edge portions of the shaft and gear, 154 and 164 respectively, do not contact each other. The projected area of gear/shaft contact A is given by the following equation:

$$A = l_1(d_1) + l_2(d_2)$$

with $l_1$=3.5 mm, $d_1$=9.5 mm and $l_2$=2.5 mm and $d_2$=9.0 mm, A=55.75 mm².

The combined effect of pressure (P) multiplied by velocity (V) is known as the PV value. The PV value defines the maximum combination of pressure and speed that a bearing material is capable of withstanding. Operating a bearing in excess of its PV value may result in premature failure. The bearing load is given as P=F/A and using the above values P=0.497N/mm², which is 69.54 psi.

Sliding velocity is calculated by the following formula:

$$V = (d)N/60$$

and with d (maximum diameter of shaft) $d_1$=9.5 mm and N (revolutions per minute of idler helical gear 122)=61.45, V=30.566 mm/s, which is 6.017 fpm. In this example, the PV rating is 418.421. The limiting PV for Acetal is 4000–10,000 as given in plastic reference handbooks.

In recapitulation, a method of designing a molded plastic shaft with an outer surface having straight edge regions joined by a small inclined region rather than a constant draft surface has been described. Having a stepped shaft surface allows for a better fit of a shaft and a corresponding gear, resulting in an acceptable PV value and less rattling.

It is, therefore, apparent that there has been provided in accordance with the present invention, a stepped hollow shaft that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. A shaft assembly comprising:
   an elongated shaft having an outside surface defining a shaft functional surface;
   the shaft functional surface having a stepped section with a first straight edge shaft region and a second straight edge shaft region joined by an inclined shaft region, the first and second straight edge shaft regions are parallel to the axis of the shaft and the inclined shaft region is inclined with respect to the axis of the shaft; and
   a gear with a stepped hub having a first straight edge hub region and a second straight edge hub region joined by an inclined hub region, the first and second straight edge hub regions are parallel to the axis of the hub and the inclined hub region is inclined with respect to the axis of the hub, wherein the first straight edge hub region functionally contacts the first straight edge shaft region and the second straight edge hub region functionally contacts the second straight edge shaft region.

2. A shaft assembly as claimed in claim 1, wherein the elongated shaft is plastic.

3. A shaft assembly as claimed in claim 1, wherein the gear is plastic.

4. A shaft assembly as claimed in claim 1, wherein only the first and second straight edge hub regions contact the shaft functional surface.

5. A shaft assembly as claimed in claim 1, further comprising a shaft base which provides support for the shaft and is integrally formed with the first straight edge shaft region.

6. A shaft assembly as claimed in claim 5, wherein the elongated shaft is cylindrical, the first straight edge shaft region having a larger surface diameter than the second straight edge shaft region surface diameter.

7. A shaft assembly as claimed in claim 5, wherein the elongated shaft has an inside surface defining a shaft bore, the shaft bore being formed in the stepped section of the shaft and the shaft base being formed as a solid member.

8. A shaft assembly as claimed in claim 7, wherein the shaft bore has a constant diameter.

9. A shaft assembly as claimed in claim 1, wherein the inclined shaft region length is less than the length of the first straight edge shaft region and the length of the second straight edge shaft region.

10. A shaft assembly as claimed in claim 9, wherein the inclined shaft section is oriented at an angle greater than 90 degrees and less than 180 degrees with respect to the second straight edge shaft region.

11. A shaft assembly as claimed in claim 10, wherein the angle at which the inclined shaft region is oriented between 120 to 150 degrees.

12. A shaft assembly as claimed in claim 1, wherein the first and second hub region and first and second shaft regions functionally contact each other so that the gear is free to rotate on the shaft.

13. A gear comprising:

a gear with a hub having a stepped region with a first straight edge hub region and a second straight edge hub region joined by an inclined hub region adapted to fit on a complementary elongated shaft with a shaft functional surface fitted therefore, the first and second straight edge hub regions are parallel to the axis of the hub and the inclined hub region is inclined with respect to the axis of the hub.

14. A gear as claimed in claim 13, wherein the gear is plastic.

15. A shaft assembly for use in a printing machine comprising:

an elongated shaft having an outside surface defining a shaft functional surface;

the shaft functional surface having a stepped section with a first straight edge shaft region and a second straight edge shaft region joined by and inclined shaft region, the first and second straight edge shaft regions are parallel to the axis of the shaft and the inclined shaft region is inclined with respect to the axis of the shaft; and a gear with a stepped hub having a first straight edge hub region and a second straight edge hub region joined by an inclined hub region, the first and second straight edge hub regions are parallel to the axis of the hub and the inclined hub region is inclined with respect to the axis of the hub, wherein the first straight edge hub region functionally contacts the first straight edge shaft region and the second straight edge hub region functionally contacts the second straight edge shaft region.

16. A shaft assembly as claimed in claim 15, wherein the shaft and the gear are plastic.

17. A shaft assembly as claimed in claim 16, wherein only the first and second straight edge hub regions contact the shaft functional surface.

18. A shaft assembly as claimed in claim 16, wherein the inclined region of the shaft is oriented at a different angle than the inclined region of the hub so that there is a space between the inclined shaft region and the inclined hub region.

19. A shaft assembly as claimed in claim 15, wherein the first and second hub region and first and second shaft regions functionally contact each other so that the gear is free to rotate on the shaft.

* * * * *